United States Patent [19]
Ho

[11] Patent Number: 6,021,212
[45] Date of Patent: Feb. 1, 2000

[54] ELECTRONIC KEY DEVICE USING A FINGERPRINT TO INITIATE A COMPUTER SYSTEM

[75] Inventor: Heng-Chun Ho, Taipei, Taiwan

[73] Assignee: Primax Electronics Ltd., Taipei Hsien, Taiwan

[21] Appl. No.: 09/034,164

[22] Filed: Mar. 2, 1998

[51] Int. Cl.[7] .................................................. G06K 9/00
[52] U.S. Cl. ........................ 382/124; 380/23; 340/825.34
[58] Field of Search ..................................... 382/115, 116, 382/124, 125, 126; 340/825.31, 825.33, 825.34; 345/163; 705/39; 380/23

[56] References Cited

U.S. PATENT DOCUMENTS

| | | | |
|---|---|---|---|
| 5,764,789 | 6/1998 | Pare, Jr. et al. | 382/115 |
| 5,838,306 | 11/1998 | O'Connor | 345/163 |
| 5,870,723 | 2/1999 | Pare, Jr. et al. | 705/39 |

*Primary Examiner*—Joseph Mancuso
*Assistant Examiner*—Vikkram Bali

[57] ABSTRACT

The present invention provides an electronic key device which can combine a fingerprint with an input ID code to generate a key signal to initiate a computer system. The key device comprises a fingerprint input module for inputting a user's fingerprint to generate a fingerprint image signal, and a fingerprint encoder having a memory for storing the fingerprint image signal, an input ID code and a fingerprint encoding program, and a processor for executing the fingerprint encoding program. The fingerprint encoding program is used for converting the fingerprint image signal according its characteristics into a digital fingerprint code, and encoding the fingerprint code and the input ID code according to a key encoding procedure to generate the key signal.

6 Claims, 3 Drawing Sheets

ELECTRONIC KEY DEVICE USING A FINGERPRINT TO INITIATE A COMPUTER SYSTEM

BACKGROUND OF THE INVENTION

1. Field of the Invention

The present invention relates to an electronic key device, and more particularly, to an electronic key device using a fingerprint to generate a key signal for initiating a computer system.

2. Description of the Prior Art

Using Internet or Intranet to transmit files and messages is quite common for today's computer users, and security protection for protecting personal data and documents becomes an important issue. Most computer systems today use passwords to prevent illegal access of their applications or databases. However, such passwords can easily be intercepted by hackers so that they can break into the computer systems later on using the intercepted passwords.

SUMMARY OF THE INVENTION

It is therefore a primary objective of the present invention to provide an electronic key device which can prevent the intercepted password from being used again by a hacker to break into a user's account.

In a preferred embodiment, the present invention provides an electronic key device for inputting a key signal to a computer system to initiate the computer system, the key device comprising:

a fingerprint input module for inputting a user's fingerprint to generate a fingerprint image signal;

a fingerprint encoder comprising:

a memory for storing the fingerprint image signal, an input ID (identification) code and a fingerprint encoding program, and a processor for executing the fingerprint encoding program;

wherein the fingerprint encoding program is used for converting the fingerprint image signal according its characteristics into a digital fingerprint code, and encoding the fingerprint code and the input ID code according to a key encoding procedure to generate the key signal. The input ID code is generated by the computer and transmitted to the key device when the key device is connected to the computer system.

It is an advantage of the present invention that the key device uses a user's fingerprint to generate a fingerprint code, and uses the fingerprint code and an input ID code provided by the computer system when the key device is connected to the computer system to generate the key signal. Since the key signal can be changed by the computer system every time when the key device is connected to the computer system, the key signal will have no use later on and thus a hacker can not use an intercepted key signal to break into a user's account. Besides, even if the key device is stolen by a hacker, it can not be used to initiate the computer system without the fingerprint of its owner.

These and other objectives of the present invention will no doubt become obvious to those of ordinary skill in the art after reading the following detailed description of the preferred embodiment which is illustrated in the various figures and drawings.

DETAILED DESCRIPTION OF THE PREFERRED EMBODIMENT

Figure 1:
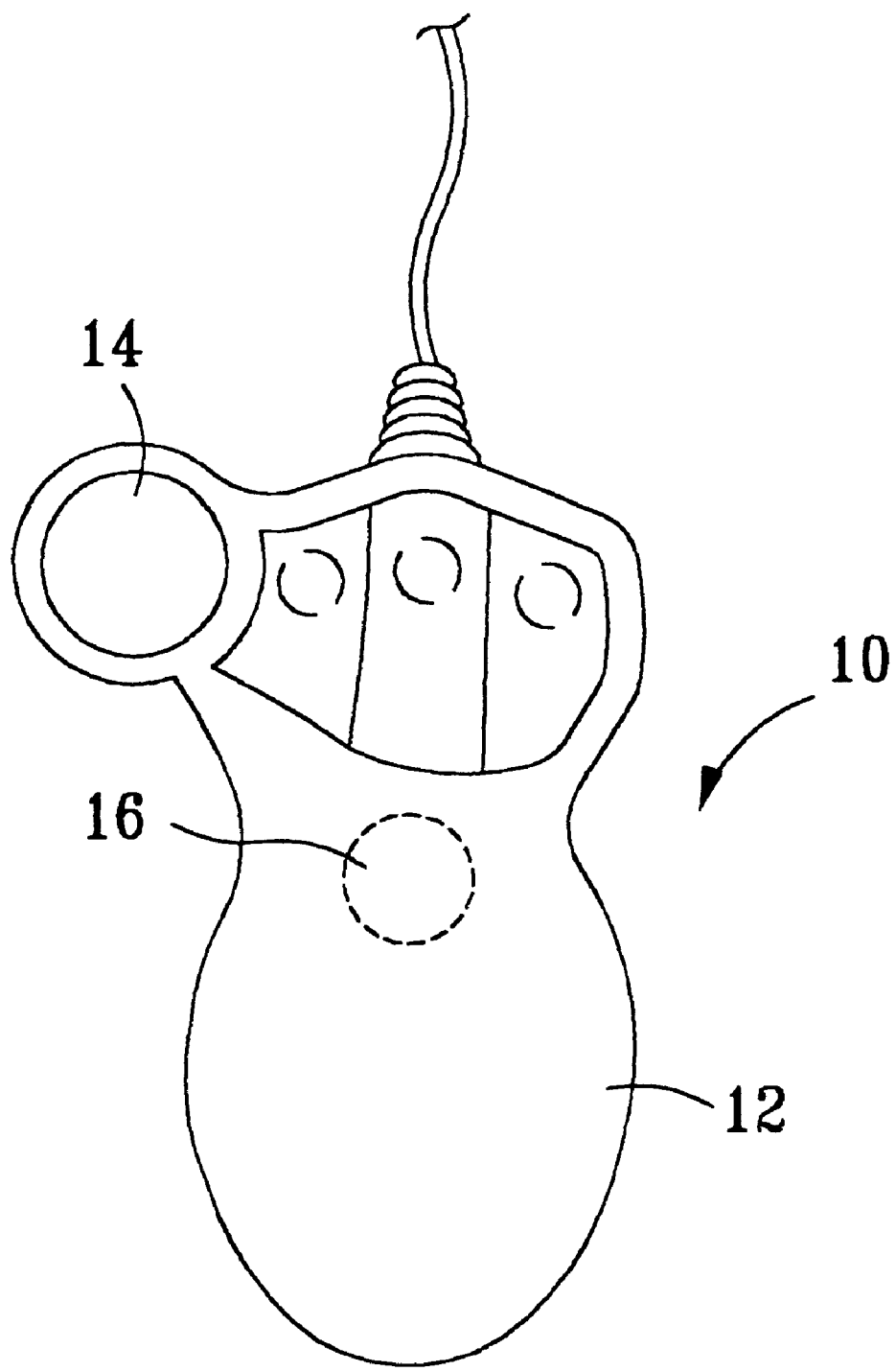
FIG. 1 is a top view of an electronic key device according to the present invention.
Figure 2:
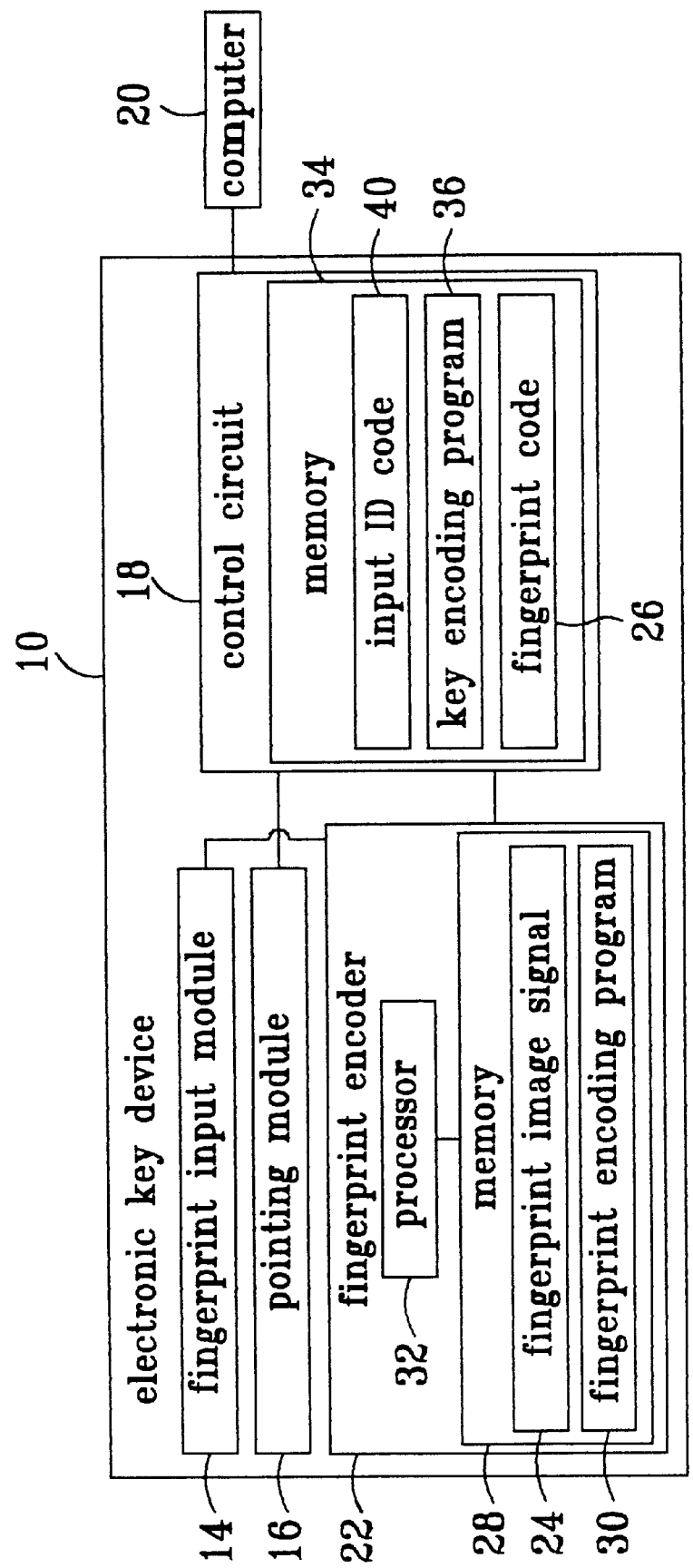
FIG. 2 is a block diagram of the key device shown in FIG. 1.

Please refer to FIG. 1 and FIG. 2. FIG. 1 is a top view of an electronic key device 10 according to the present invention. FIG. 2 is a function block diagram of the key device 10. The key device 10 is connected to a computer system 20. It comprises a housing 12, a fingerprint input module 14 for inputting a fingerprint of a user to generate a fingerprint image signal 24, a fingerprint encoder 22 for encoding the fingerprint image signal 24 to generate a fingerprint code 26 according to the characteristics of the fingerprint, a pointing module 16 for generating a cursor control signal according to a user's input, and a control circuit 18 electrically connected to the fingerprint encoder 22 and the pointing module 16 for transmitting the cursor control signal to the computer system 20 to control movements of a cursor displayed in the computer system 20.

The fingerprint encoder 22 comprises a memory 28 for storing the fingerprint image signal 24 and a fingerprint encoding program 30, and a processor 32 for executing the fingerprint encoding program 30. The fingerprint encoding program 30 is used for converting the fingerprint image signal 24 into the fingerprint code 26 according to the characteristics of the fingerprint.

The control circuit 18 comprises a memory 34 for storing the fingerprint code 26, a key encoding program 36, and an input ID code 40. The input ID code 40 is randomly generated by the computer system 20 and transmitted to the key device 10 each time when the key device 10 is connected to the computer system 20. The key encoding program 36 is used for encoding the fingerprint code 26 and the input ID code 40 according to a key encoding procedure to generate a key signal, and the key signal is transmitted to the computer system 20 by the control circuit 18 to initiate the computer system 20.

Since the input ID code 40 can be changed by the computer system 20 each time when the key device 10 is connected to the computer system 20, the key signal generated by the control circuit 18 will also be changed accordingly. Because only the computer system 20 knows the key encoding procedure of the key encoding program 36, there is no use for a hacker to intercept the key signal since it will be useless when the hacker tries to break into the computer 18. In other words, the hacker cannot correctly generate a key signal unless the hacker has the correct fingerprint code 26 and the key encoding program 36. Besides, if the key device 10 is stolen by the hacker, the hacker still can not break into the computer 18 since a correct finger is required to generate the fingerprint code 26 by using the fingerprint input module 14.

The key device 10 also can use the fingerprint image signal 24 generated by the fingerprint input module 14 to initiate the computer system 20 directly. In this case the fingerprint encoder 22 can be eliminated and the control circuit 18 is connected to the fingerprint input module 14 directly and will transmit the fingerprint image signal 24 generated by the fingerprint input module 14 to the computer system 20 to initiate the computer system 20.

Figure 3:
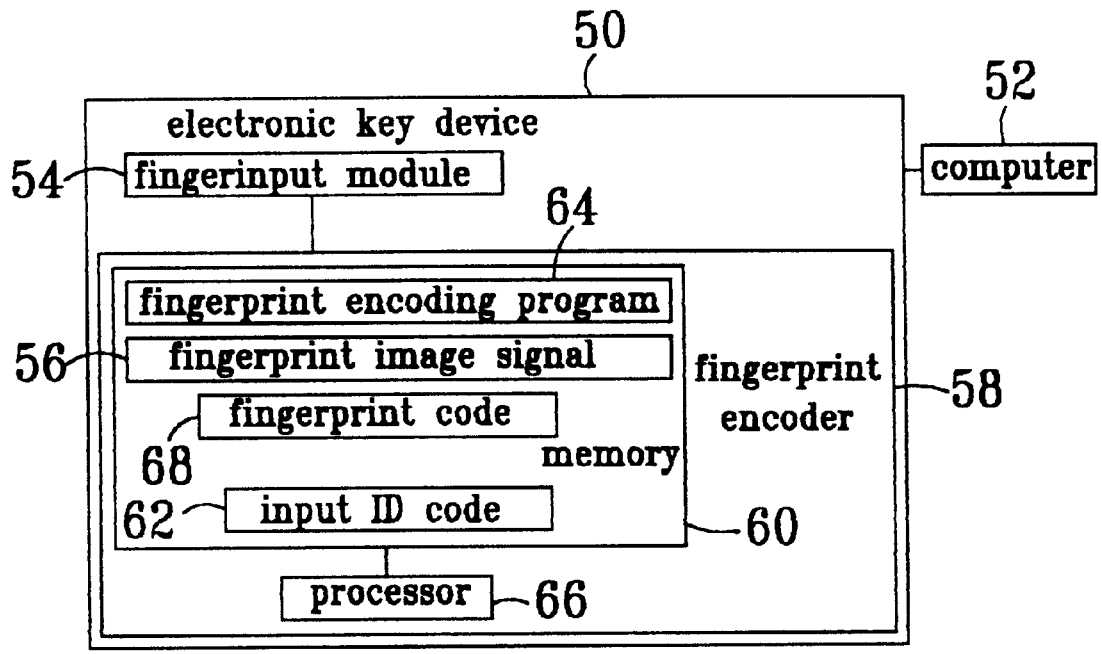
FIG. 3 is a block diagram of an alternative electronic key device according to the present invention.

Please refer to FIG. 3. FIG. 3 is a function block diagram of an alternative electronic key device 50 according to the present invention. The key device 50 is used for inputting a key signal to a computer system 52 to initiate the computer system 52. The key device 50 comprises a fingerprint input module 54 for inputting a user's fingerprint to generate a fingerprint image signal 56, and a fingerprint encoder 58 comprising a memory 60 for storing the fingerprint image signal 56, an input ID code 62 and a fingerprint encoding program 64, and a processor 66 for executing the fingerprint encoding program 64. The fingerprint encoding program 64 is used for converting the fingerprint image signal 56 according to the characteristics of the fingerprint into a fingerprint code 68, and encoding the fingerprint code 68 and the input ID code 62 according to a key encoding procedure to generate a key signal to initiate the computer system 52. The input ID code 62 is randomly generated by the computer system 52 and transmitted to the key device 50 each time when the key device 50 is connected to the computer system 52. The difference between the key device 50 and the key device 10 shown in FIG. 2 is that the key device 50 does not include any other input module such as the pointing module 16.

Figure 4:
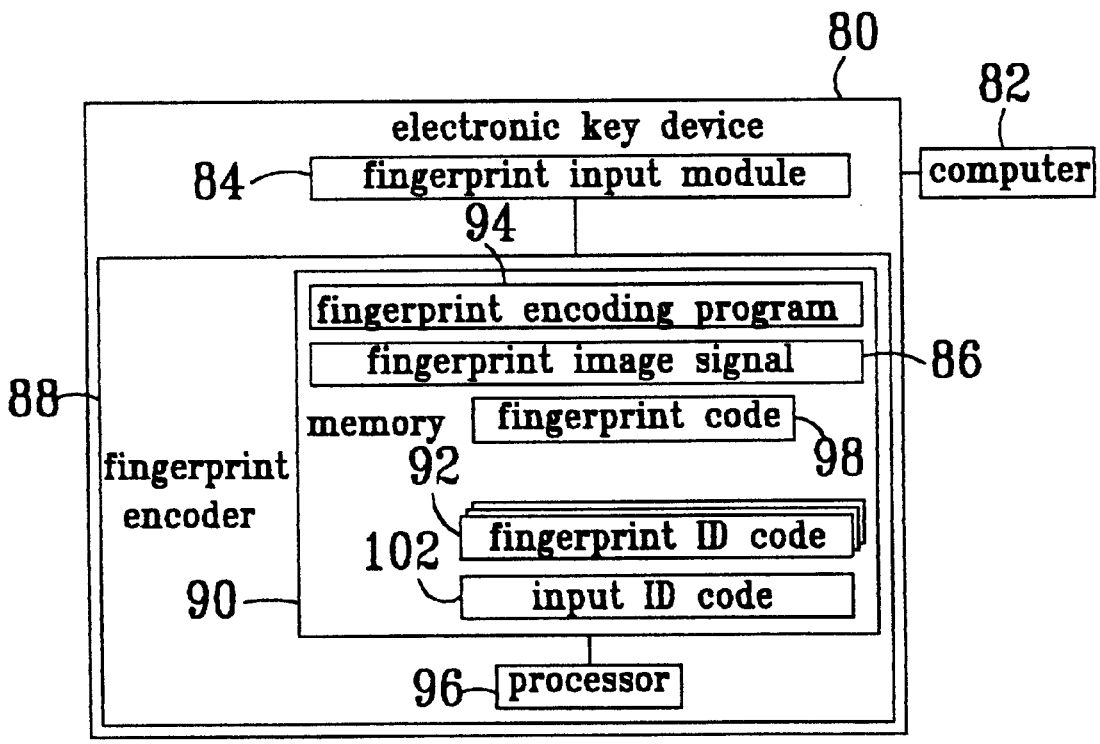
FIG. 4 is a function block diagram of another electronic key device according to the present invention.

Please refer to FIG. 4. FIG. 4 is a function block diagram of another electronic key device 80 according to the present invention. The key device 80 is used for inputting a key signal to a computer system 82 to initiate the computer system 82. The key device 80 comprises a fingerprint input module 84 for inputting a user's fingerprint to generate a fingerprint image signal 86, and a fingerprint encoder 88 comprising a memory 90 for storing the fingerprint image signal 86, a plurality of fingerprint ID codes 92, an input ID code 102 randomly generated by the computer system 82 each time when the key device 80 is connected to the computer system 82, and a fingerprint encoding program 94, and a processor 96 for executing the fingerprint encoding program 94. The fingerprint ID codes 92 are inputted from the computer system 82 for identifying authorized fingerprints.

The fingerprint encoding program 94 will convert the fingerprint image signal 86 according to its characteristics into a fingerprint code 98, match the fingerprint code 98 with the fingerprint ID codes 92, and encode the fingerprint code 98 and the input ID code 102 according to a key encoding procedure to generate a key signal for initiating the computer system 82. Since the key device 80 has a plurality of fingerprint ID codes 92, various fingers can be used to initiate the computer system 82.

Those skilled in the art will readily observe that numerous modifications and alternations of the device may be made while retaining the teachings of the invention. Accordingly, the above disclosure should be construed as limited only by the metes and bounds of the appended claims.

What is claimed is:

1. An electronic key device for inputting a key signal to a computer system to initiate the computer system, the key device comprising:

a fingerprint input module for inputting a user's fingerprint to generate a fingerprint image signal;

a fingerprint encoder comprising:

a memory for storing the fingerprint image signal, an input ID (identification) code and a fingerprint encoding program, and a processor for executing the fingerprint encoding program;

wherein the input ID code is randomly generated by the computer system and transmitted to the key device when the key device is connected to the computer system, and the fingerprint encoding program is used for converting the fingerprint image signal according its characteristics into a digital fingerprint code, and encoding the fingerprint code and the input ID code according to a key encoding procedure to generate the key signal.

2. An electronic key device for inputting a key signal to a computer system to initiate the computer system, the key device comprising:

a fingerprint input module for inputting a user's fingerprint to generate a fingerprint image signal; and a fingerprint encoder comprising:

a memory for storing the fingerprint image signal, an input ID code, at least one fingerprint ID code and a fingerprint encoding program, and a processor for executing the fingerprint encoding program;

wherein the input ID code is randomly generated by the computer system and transmitted to the key device when the key device is connected to the computer system, and the fingerprint encoding program is used for converting the fingerprint image signal according to its characteristics into a digital fingerprint code, matching the fingerprint code with the fingerprint ID codes, and converting the fingerprint code into the key signal by encoding the fingerprint code with the input ID code according to a key encoding procedure if the fingerprint code is matched with one of the fingerprint ID codes.

3. The key device of claim 2 wherein the fingerprint ID codes are inputted from the computer system.

4. A cursor control device comprising:

a fingerprint input module for inputting a user's fingerprint to generate a fingerprint image signal;

a fingerprint encoder for converting the fingerprint image signal according to its characteristics into a fingerprint code;

a pointing module for generating a cursor control signal; and a control circuit electrically connected to the fingerprint encoder and the input module for encoding the fingerprint code and an input ID code according to a key encoding procedure to generate a key signal, transmitting the key signal to a computer system to initiate the computer system, and transmitting the cursor control signal to the computer system for controlling movements of a cursor displayed in the computer system;

wherein the input ID code is randomly generated by the computer system and transmitted to the cursor control device when the cursor control device is connected to the computer system.

5. The cursor control device of claim 4 wherein the fingerprint encoder comprises a memory for storing the fingerprint image signal and a fingerprint encoding program for converting the fingerprint image signal into the fingerprint code, and a processor for executing the fingerprint encoding program.

6. The cursor control device of claim 4 wherein the control circuit comprises a memory for storing the fingerprint code and a key encoding program for encoding the fingerprint code and the input ID code according to the key encoding procedure to generate the key signal.

* * * * *